United States Patent [19]

Asano

[11] Patent Number: 6,102,480
[45] Date of Patent: Aug. 15, 2000

[54] RECLINING MECHANISM FOR VEHICLE SEAT

[75] Inventor: Makoto Asano, Toyota, Japan

[73] Assignee: Araco Kabushiki Kaisha, Aichi-ken, Japan

[21] Appl. No.: 09/337,327

[22] Filed: Jun. 21, 1999

[30] Foreign Application Priority Data

Jun. 22, 1998 [JP] Japan .................................. 10-175083

[51] Int. Cl.⁷ ..................................................... B60N 2/10
[52] U.S. Cl. ........................................... 297/366; 297/367
[58] Field of Search ..................................... 297/366, 367

[56] References Cited

U.S. PATENT DOCUMENTS

| | | | |
|---|---|---|---|
| 4,087,885 | 5/1978 | Gillentine et al. | 297/367 X |
| 4,997,223 | 3/1991 | Croft | 297/367 |
| 5,590,931 | 1/1997 | Fourrey et al. | 297/367 X |
| 5,622,407 | 4/1997 | Yamada et al. | 297/367 X |
| 5,749,624 | 5/1998 | Yoshida | 297/367 |
| 5,749,626 | 5/1998 | Yoshida | 297/367 |
| 5,762,400 | 5/1978 | Okazaki et al. | 297/367 |
| 5,785,386 | 7/1998 | Yoshida et al. | 297/367 |
| 5,816,656 | 10/1998 | Hoshihara et al. | 297/367 |
| 5,873,630 | 2/1999 | Yoshida et al. | 297/367 |
| 6,023,994 | 2/2000 | Yoshida | 297/367 X |
| 6,024,410 | 2/2000 | Yoshida | 297/366 X |

FOREIGN PATENT DOCUMENTS

56-52010  9/1981  Japan .
7-136032  5/1995  Japan .
8-52040  2/1996  Japan .

*Primary Examiner*—Peter M. Cuomo
*Assistant Examiner*—Rodney B. White
*Attorney, Agent, or Firm*—Reed Smith Hazel & Thomas LLP

[57] ABSTRACT

A reclining mechanism for a vehicle seat, which is composed of a first arm member for attachment to a frame structure of a seat cushion or a back rest of the vehicle seat; a second arm member for attachment to a frame structure of the other of the back rest or the seat cushion, the second arm member being connected with the first arm member by means of a hinge pin for relative rotation about the hinge pin and having a circular ratchet portion concentric with the binge pin; a pair of diametrically opposed slide pawls slidably coupled with the fist arm member in a radial direction with respect to the hinge pin to be moved toward and away from the ratchet portion of the second arm member; a cam plate mounted on the hinge pin for rotation therewith and being engaged with the slide pawls for engaging the slide pawls with the ratchet portion of the second arm member when the hinge pin is retained in position under load of a torsion spring assembled thereon and for disengaging the slide pawls from the ratchet portion of the second arm member when the hinge pin is rotated against the load of the torsion spring; a support plate threadedly engaged with the hinge pin to be moved by rotation of the hinge pin in an axial direction for receiving the slide pawls thereon when the slide pawls are maintained in engagement with the ratchet portion of the second arm member and for releasing the slide pawls therefrom when the slide pawls are disengaged from the ratchet portion of the second arm member.

4 Claims, 7 Drawing Sheets

RECLINING MECHANISM FOR VEHICLE SEAT

BACKGROUND OF THE INVENTION

1. Field of the Invention

The present invention relates to a reclining mechanism for a vehicle seat for adjusting an inclined angle of a back rest of the seat relative to a seat cushion.

2. Description of the Prior Art

Disclosed in Japanese Patent Laid-open Publication No. 8-52040 is a reclining mechanism for a vehicle seat which is composed of a pair of arm members for attachment to a frame structure of a seat cushion and to a frame structure of a back rest, the arm members being connected by means of a hinge pin for relative rotation about the hinge pin, a slide pawl slidably coupled with one of the arm members to be moved in a radial direction with respect to the hinge pin for engagement with a ratchet portion of the other of the arm members and for disengagement from the ratchet portion, and a cam element mounted on the hinge pin for rotation therewith and engaged with the slide pawl for maintaining the slide pawl in engagement with the ratchet portion of the arm member and for disengaging the slide pawl from the ratchet portion when it is rotated with the hinge pin. In the reclining mechanism, the relative rotation of the arm members is restricted by engagement of the slide pawl with the ratchet portion to lock the back rest at an inclined angle and is permitted by disengagement of the slide pawl from the ratchet portion for adjustment of the inclined angle of the back rest.

In the reclining mechanism the engagement of the slide pawl with the ratchet portion of the arm member is maintained in a condition where the slide pawl is pressed by engagement with a potion of the cam element. When the cam element is rotated with the hinge pin to disengage the slide pawl from the ratchet portion of the arm member, the slide pawl is retracted by engagement with a portion of the cam element. If the reclining mechanism is applied with a load, the slide pawl is slightly rotated due to an error in assembly of the component parts of the relining mechanism. This results in looseness in engagement of the slide pawl with the ratchet portion of the arm member.

SUMMARY OF THE INVENTION

It is, therefore, a primary object of the present invention to provide a reclining mechanism for a vehicle seat wherein rotation of the slide pawl is prevented to firmly maintain the engagement of the slide pawl with the ratchet portion even if the reclining mechanism is applied with a heavy load.

According to the present invention, the object is accomplished by providing a reclining mechanism for a vehicle seat, which comprises a first arm member for attachment to a frame structure of a seat cushion or a back rest of the vehicle seat, a second arm member for attachment to a frame structure of the other of the back rest or the seat cushion, the second arm member being connected with the first arm member by means of a hinge pin for relative rotation about the hinge pin and having a circular ratchet portion concentric with the hinge pin, a slide pawl slidably coupled with the first arm member in a radial direction with respect to the hinge pin to be moved toward and away from the ratchet portion of the second arm member, a cam plate mounted on the hinge pin for rotation therewith and being engaged with the slide pawl for engaging the slide pawl with the ratchet portion of the second arm member when the hinge pin is retained in position under load of a torsion spring assembled thereon and for disengaging the slide pawl from the ratchet portion of the second arm member when the hinge pin is rotated against the load of the torsion spring, a support plate threadedly engaged with the hinge pin to be moved by rotation of the binge pin in an axial direction for receiving the slide pawl thereon when the slide pawl is maintained in engagement with the ratchet portion of the second arm member and for releasing the slide pawl therefrom when the slide pawl is disengaged from the ratchet portion of the second arm member.

In a practical embodiment of the present invention, the slide pawl is formed at its outer end with a semi-circle toothed portion for engagement with the ratchet portion of the second arm member and at its inner end with a semi-circular stepped portion, the arm plate is formed with a cam slot engaged with a cam pin provided on the slide pawl to maintain the slide pawl into engagement with the ratchet portion of the second arm member when the hinge pin is retained in position under the load of the torsion spring and to disengage the slide pawl from the ratchet portion of the second arm member when the hinge pin is rotated against the load of the torsion spring, and the support plate is in the form of an annular plate which is formed with a semi-circular stepped portion for engagement with the semi-circular stepped portion of the slide pawl.

According to an aspect of the present invention, there is provided a reclining mechanism for a vehicle seat, which comprises a first arm member for attachment to a frame structure of a seat cushion or a back rest of the vehicle seat, a second arm member for attachment to a frame structure of the other of the back rest or the seat cushion, the second arm member being connected with the first arm member by means of a hinge pin for relative rotation about the hinge pin and having a circular ratchet portion concentric with the hinge pin, a pair of diametrically opposed slide pawls slidably coupled with the first arm member in a radial direction with respect to the hinge pin to be moved toward and away from the ratchet portion of the second arm member, a cam plate mounted on the hinge pin for rotation therewith and being engaged with the slide pawls for engaging the slide pawls with the ratchet portion of the second arm member when the hinge pin is retained in position under load of a torsion spring assembled thereon and for disengaging the slide pawls from the ratchet portion of the second arm member when the hinge pin is rotated against the load of the torsion spring, a support plate threadedly engaged with the hinge pin to be moved by rotation of the hinge pin in au axial direction for receiving the slide pawls thereon when the slide pawls are maintained in engagement with the ratchet portion of the second arm member and for releasing the slide pawls therefrom when the slide pawls are disengaged from the ratchet portion of the second arm member.

In a practical embodiment of the reclining mechanism described above, the slide pawls each are formed at their outer ends with a semi-circular toothed portion for engagement with the ratchet portion of the second arm member and at their inner ends with a semi-circular stepped portion, the cam plate is formed with a pair of diametrically opposed cam slots engaged with each cam pin provided on the slide pawls to maintain the slide pawls into engagement with the ratchet portion of the second arm member when the hinge pin is retained in position under the load of the torsion spring and to disengage the slide pawls from the ratchet portion of the second arm member when the hinge pin is rotated against the load of the torsion spring, and the support plate is in the form of an annular plate which is formed with a pair of semi-circular stepped portions for engagement with the semi-circular stepped portions of the slide pawls.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
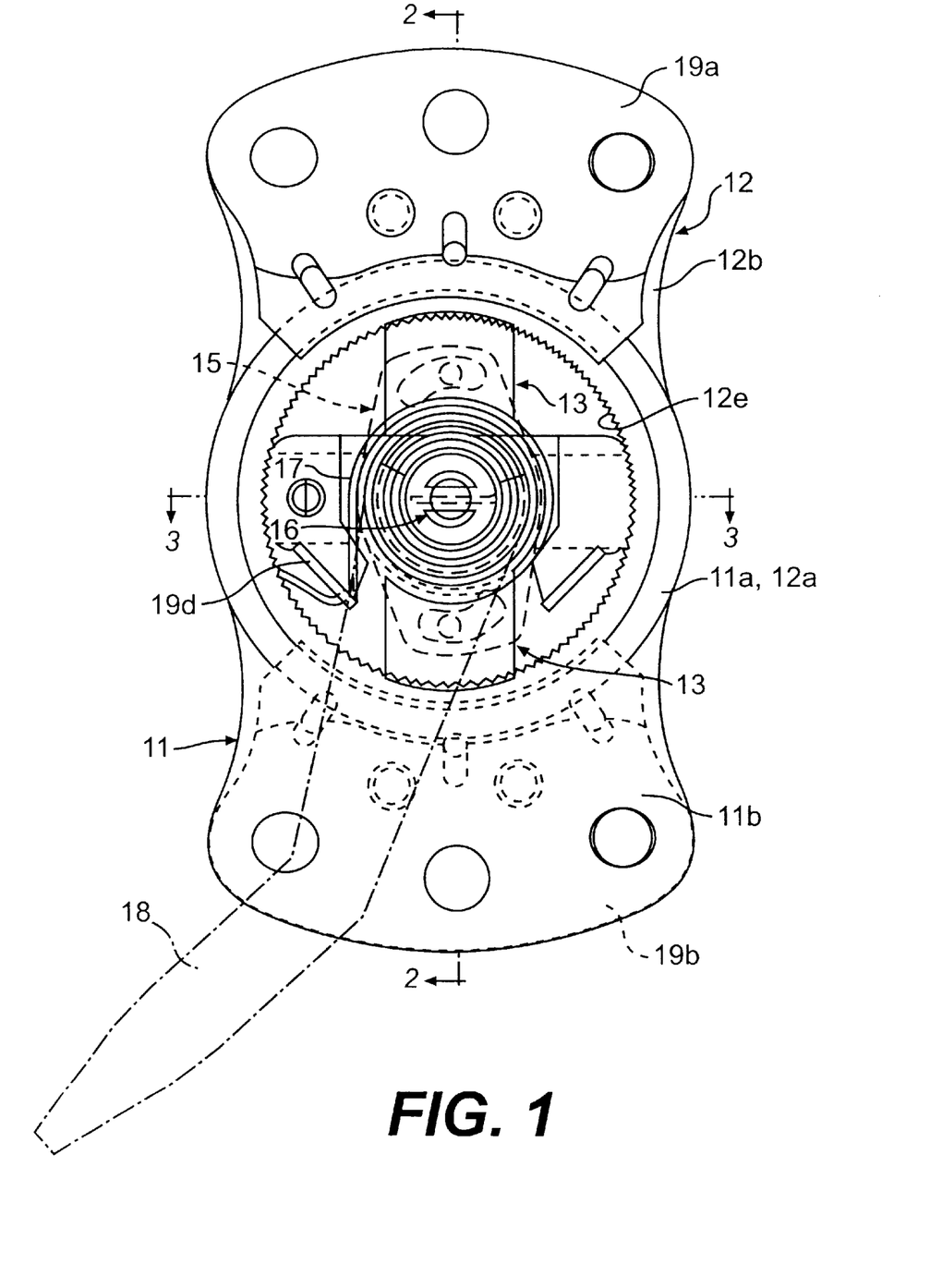
FIG. 1 is a partly broken front view of a reclining mechanism in accordance with the present invention.
Figures 2, 3:
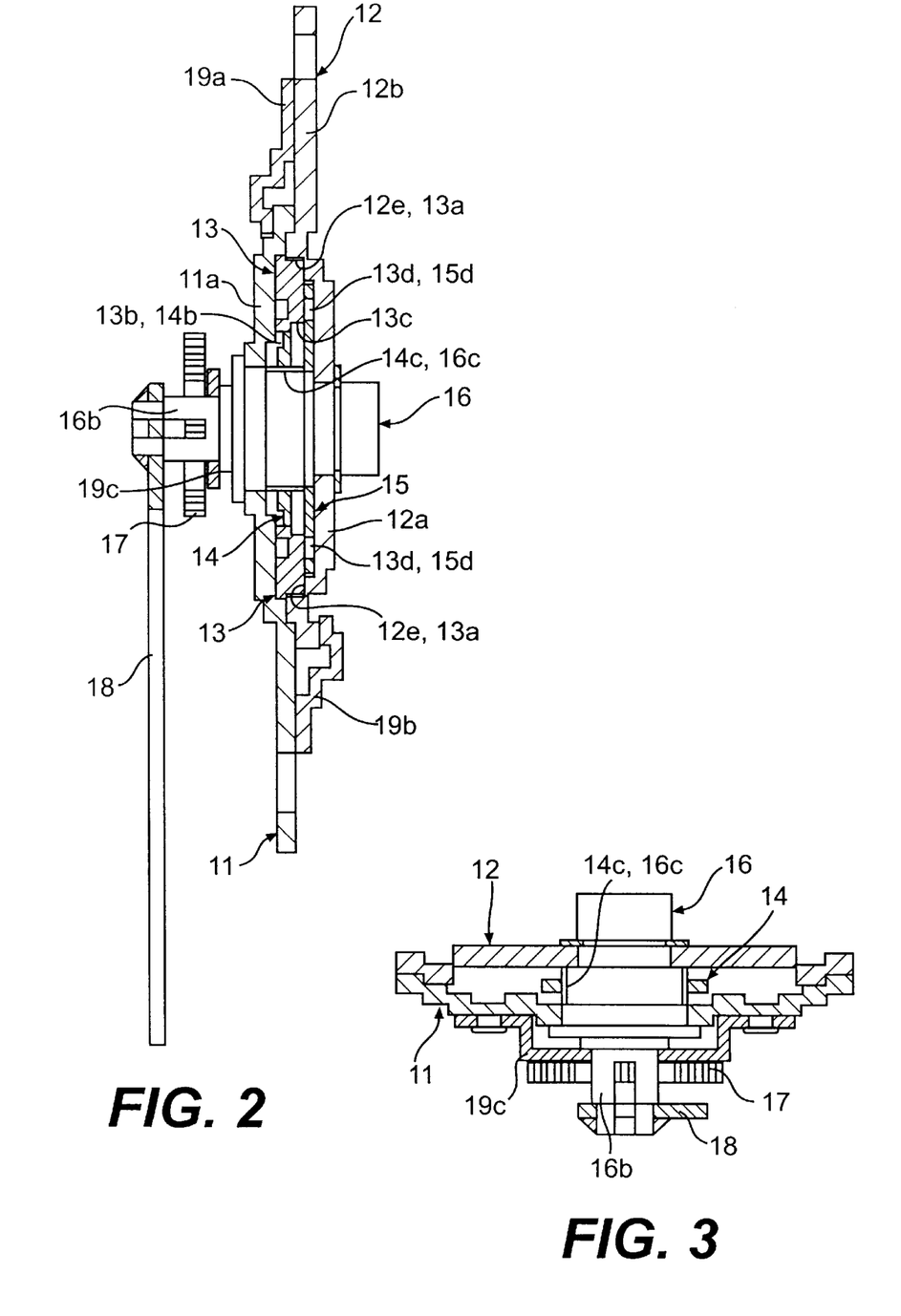
FIG. 2 is a vertical sectional view of the reclining mechanism taken along line 2—2 in FIG. 1.
FIG. 3 is a cross-sectional view of the reclining mechanism taken along line 3—3 in FIG. 1.

Illustrated in FIGS. 1 to 3 is a reclining mechanism for a vehicle seat in accordance with the present invention, which reclining mechanism comprises a first arm member 11 for attachment to a frame structure of a seat cushion (not shown) of the vehicle seat, a second arm member 12 for attachment to a frame structure of a back rest (not shown) of the vehicle seat, a pair of slide pawls 13, a support plate 14, a cam plate 15, a hinge pin 16, a spiral torsion spring 17 and an operation lever 18. The first and second arm members 11 and 12 are coupled to contain the slide pawls 13, support plate 14 and cam plate 15 therein. The second arm member 12 is connected to the first arm member 11 by means of the hinge pin 16 for relative rotation about the hinge pin 16. The reclining mechanism is assembled with the vehicle seat in such a manner that the second arm member 12 is locked to the first arm member 11 at a selected position to retain the back rest at an inclined angle and that the second arm member 12 is released from the first arm member 11 to permit adjustment of the inclined angle of the back rest.

Figure 4A:
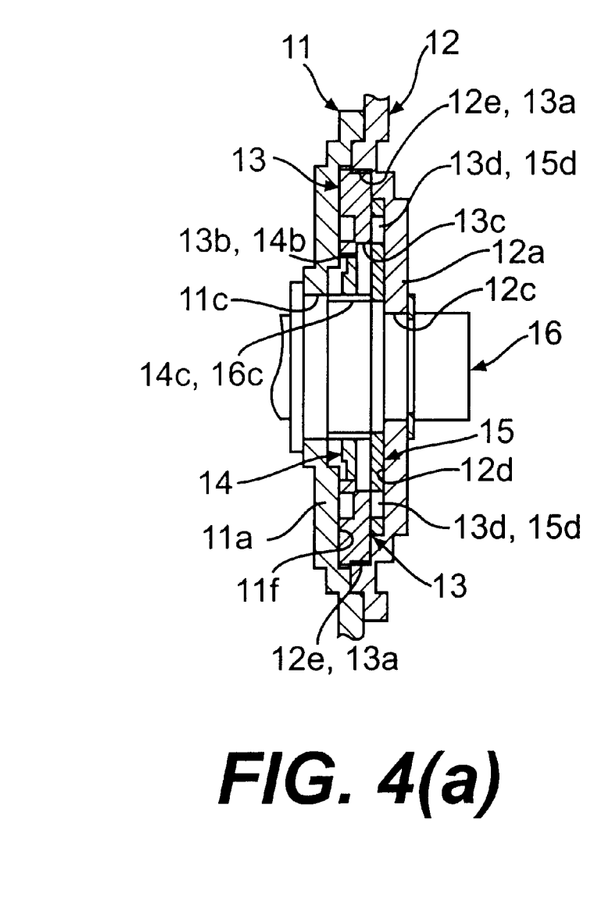
FIG. 4(a) is a vertical sectional view illustrating main component parts of the reclining mechanism in a condition where a hinge is retained in position under load of a torsion spring assembled thereon.
Figure 4B:
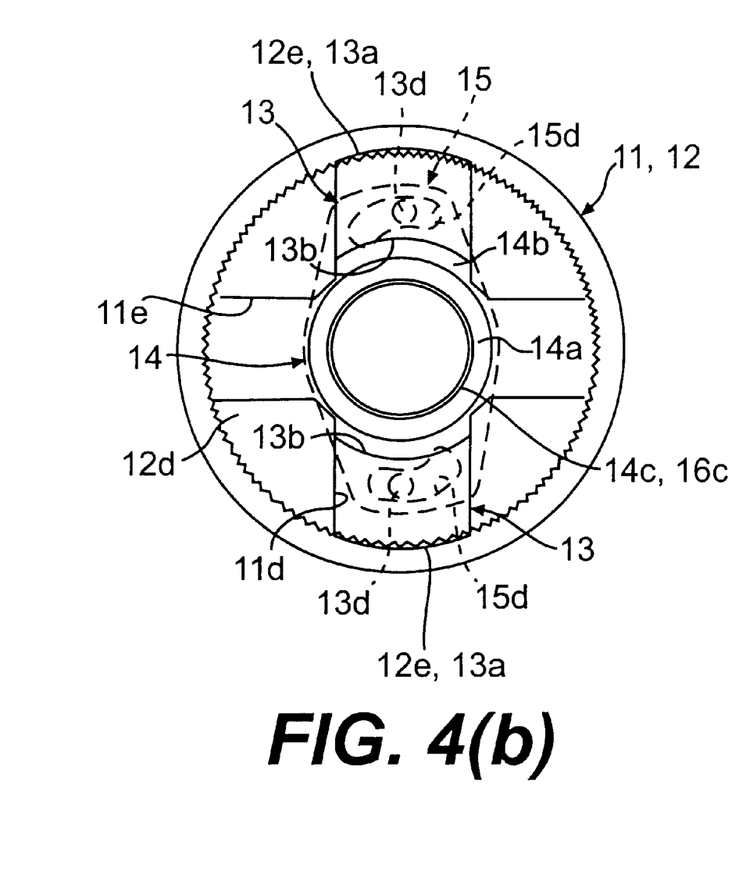
FIG. 4(b) is a front view illustrating the main component parts shown in FIG. 4(a)
Figure 5A:
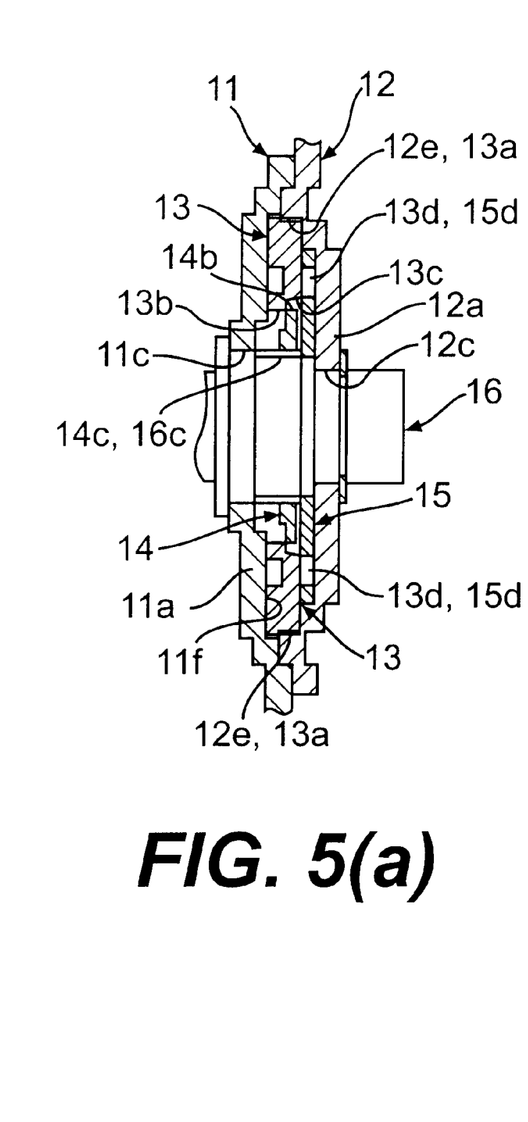
FIG. 5(a) is a vertical sectional view illustrating the main component parts of the reclining mechanism in a condition where the hinge pin is being rotated in a clockwise direction.
Figure 5B:
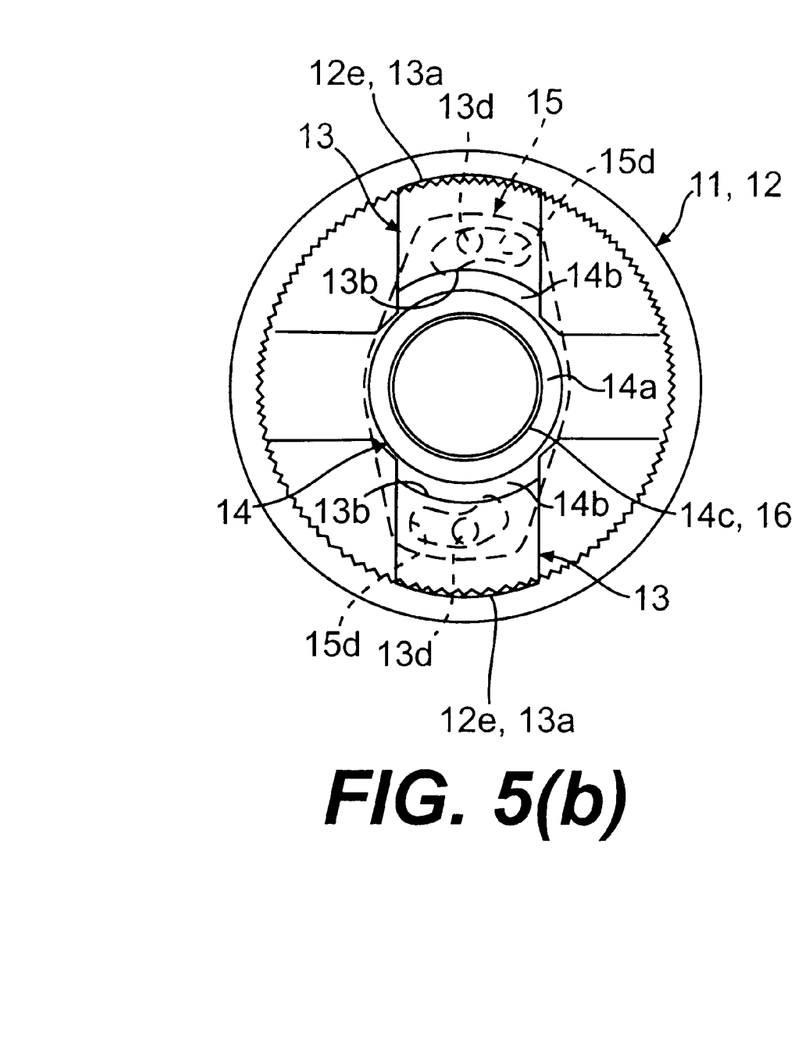
FIG. 5(b) is a front view illustrating the main component parts shown in FIG. 5(a)

As shown in FIGS. 1 to 3 and FIGS. 4(a), 4(b), the first arm member has an upper portion 11a formed to contain the slide pawls 13 and support plate 14 and a lower portion 11b for attachment to the frame structure of the seat cushion. As shown in FIG. 4(b), the upper portion 11a of first arm member 11 is formed therein with a vertical guide groove 11d across a central hole 11c and a lateral guide groove 11e perpendicular to the vertical guide groove 11d. The vertical guide groove 11d is slightly extended outward from the inner periphery of a circular recess 11f formed in the upper portion 11a, while the lateral guide groove 11e is extended to the inner periphery of the circular recess 11f.

As shown in FIGS. 1 to 3 and FIGS. 4(a), 4(b), the second arm member 12 has a lower portion 12a formed to contain the slide pawls 13, support plate 14 and cam plate 15 and an upper portion 12b for attachment to the frame structure of the back rest. The lower portion 12a of second arm member 12 is formed a circular recess 12d concentric with a central hole 12c. The circular recess 12d is formed coaxially with the circular recess 11f of first arm member 11 such that the central hole 12c of second arm member 12 is opposed to the central hole 11c of first arm member 11. The circular recess 12d of second arm member 12 is formed at its inner periphery with a circular ratchet portion 12e.

Figure 7A:
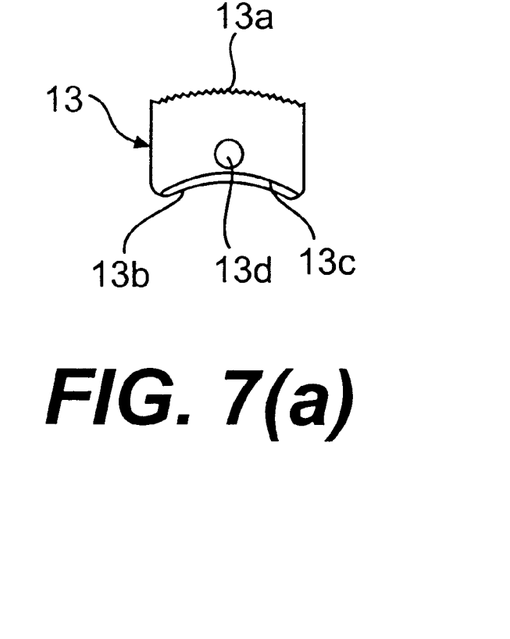
FIG. 7(a) is a front view of a slide pawl shown FIGS. 4(a) and 4(b)
Figure 7B:
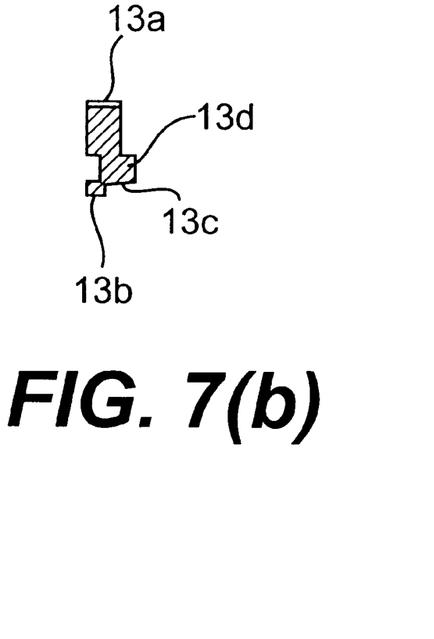
FIG. 7(b) is a sectional view of the slide pawl shown in FIG. 7(a)

The slide pawls 13 are formed in the same width and thickness. As shown in FIGS. 7(a) and 7(b), the slide pawls 13 each are formed at their outer ends with a semi-circular toothed portion 13a and at their inner ends with a semi-circular stepped portion 13b undercut at 13c. The slide pawls 13 each are provided thereon with a cam pin 13d. The thickness of each of the slide pawls 13 is determined to correspond with a space defined by the vertical guide groove 11d of first arm member 11 and the circular recess 12d of second arm member 12, and the width of each of the slide pawls 13 is determined to correspond with the width of the vertical guide groove 11d of first arm member 11. The semi-circular toothed portions of slide pawls 13 are positioned to be engaged with and disengaged from the ratchet portions 12e of second arm member 12. Thus, the slide pawls 13 are slidably coupled with the vertical guide groove 11d of first arm member 11.

Figure 8A:
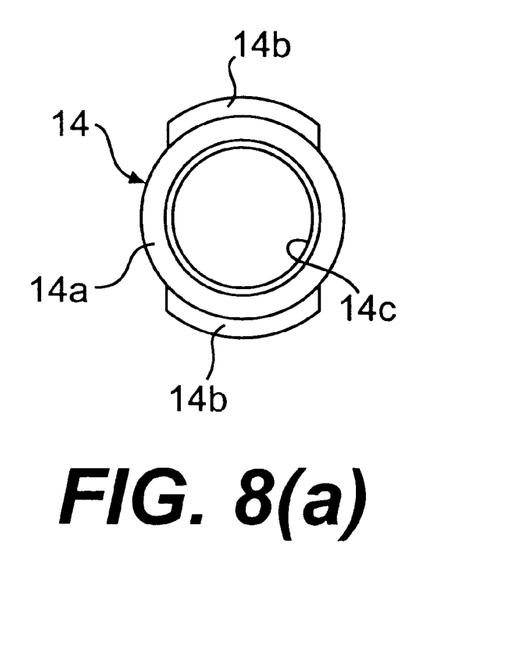
FIG. 8(a) is a front view of a support plate shown in FIGS. 4(a) and 4(b)
Figure 8B:
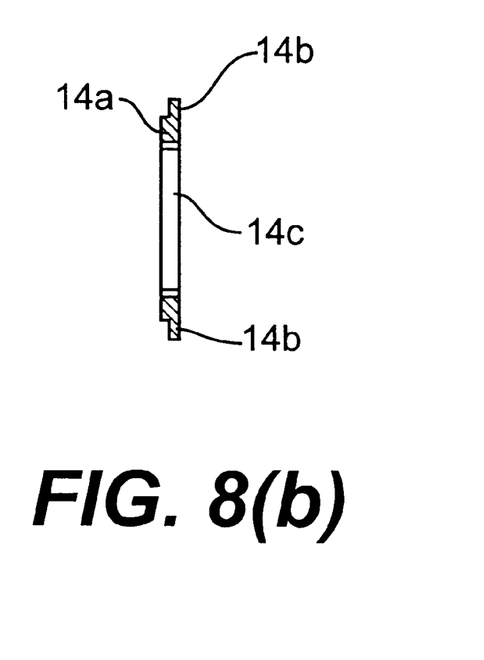
FIG. 8(b) is a sectional view of the support plate shown in FIG. 8(a)
Figure 9A:
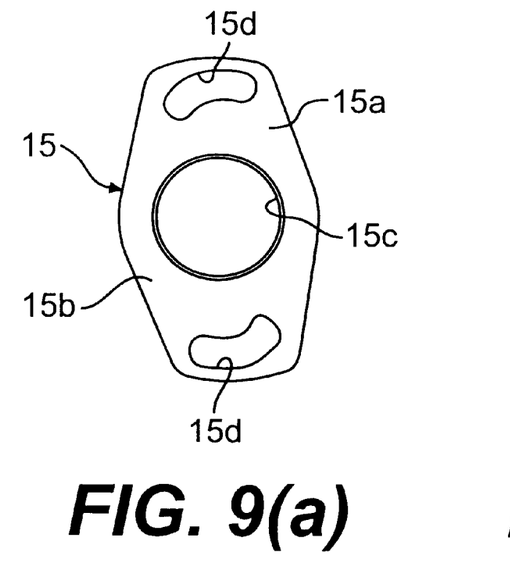
FIG. 9(a) is a front view of a cam plate shown in FIGS. 4(a) and 4(b)
Figure 9B:
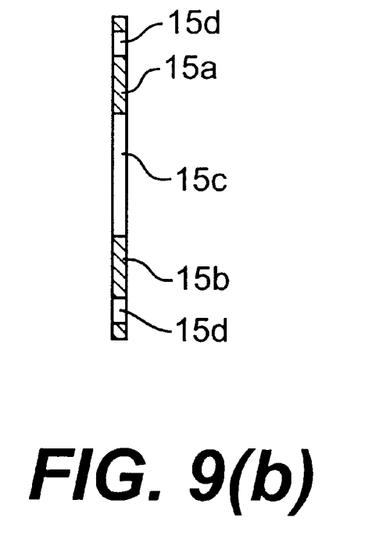
FIG. 9(b) is a sectional view of the cam plate shown in FIG. 9(a)

As shown in FIG. 8, the support plate 14 is in the form of an annular plate 14a formed at its outer periphery with a pair of semi-circular stepped portions 14b to be coupled with the semi-circular stepped portion 13b of each slide pawl 13. The central aperture 14c of annular support plate 14 is formed at its inner periphery with a screw thread. The support plate 14 is threadedly engaged with the hinge pin 16 as described later. As shown in FIG. 9, the cam plate 15 has a pair of arm portions 15a, 15b and a central mounting hole 15c. The cam plate 15 is formed at its arm portions 15a, 15b with a pair of diametrically opposed semi-circular cam slots 15d concentric with the mounting hole 15c. The cam plate 15 is mounted on the hinge pin 16 for rotation therewith and contained in the circular recess 12d of second arm member 12. The cam pins 13d of slide pawls 13 are slidably engaged with the semi-circular cam slots 15d of cam plate 15.

Figure 6A:
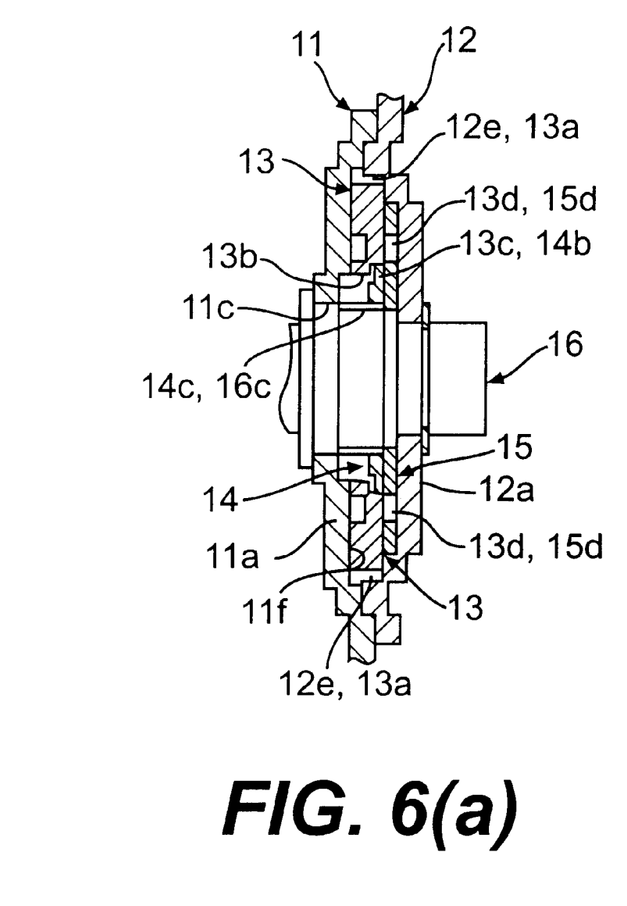
FIG. 6(a) is a vertical sectional view illustrating the main component parts of the reclining mechanism in a condition where the hinge has been rotated in the clockwise direction.
Figure 6B:
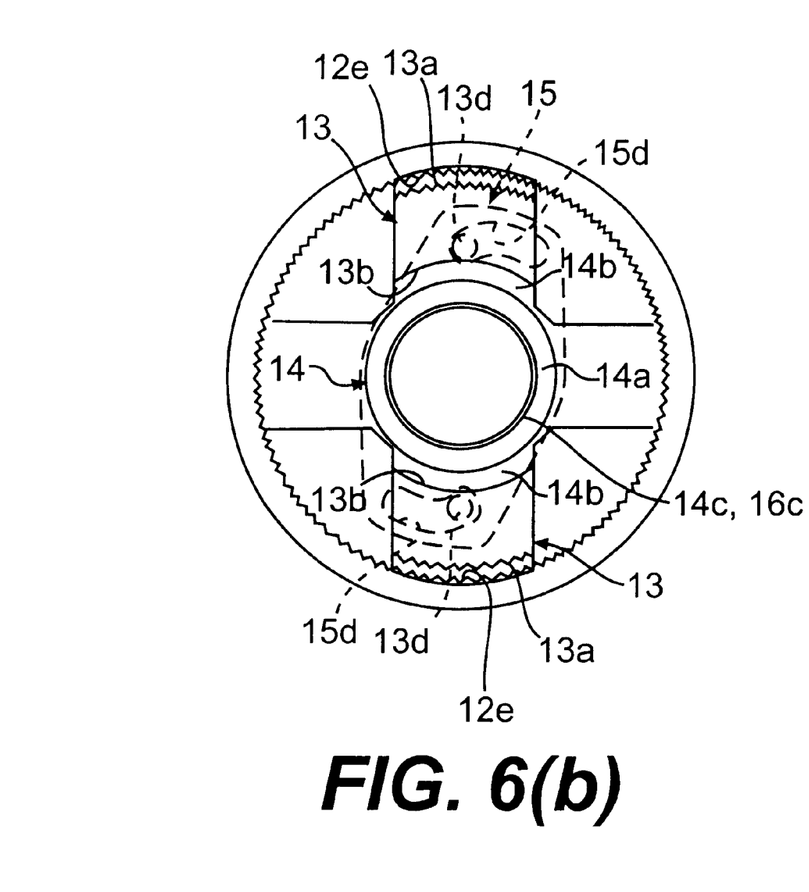
FIG. 6(b) is a front view illustrating the main component parts of the reclining mechanism shown in FIG. 6(a)

In a condition where the slide pawls 13 are maintained in engagement with the ratchet portions 12e as shown in FIGS. 4(a) and 4(b), the support plate 14 is positioned to receive the slide pawls 13 thereon at its semi-circular stepped portions 14b, and the cam pins 13d of slide pawls 13 are located in each lateral portion of the cam slots 15d. When the cam plate 15 is rotated with the hinge pin 16 by operation of the operation lever 18 to disengage the slide pawls 13 from the ratchet portion 12e of second arm member 12, the support plate 14 is moved by rotation of the hinge pin 16 rightward in the axial direction and disengaged from the semi-circular stepped portions 13b of slide pawls 13 as shown in FIG. 6(a).

Figure 10A:
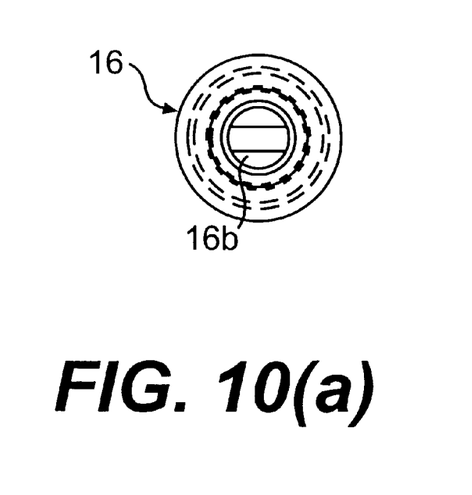
FIG. 10(a) is a front view of the hinge pin shown in FIGS. 4(a) and 4(b)
Figure 10B:
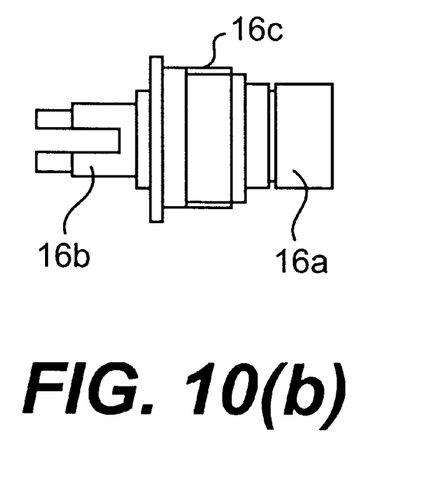
FIG. 10(b) is a side view of the hinge pin shown in FIG. 10(a).

As shown in FIG. 10, the hinge pin 16 has a stepped shaft portion 16a composed of large and small diameter portions and a hook portion 16b. The large diameter portion of hinge pin 16 is formed at its outer periphery with a screw thread 16c for engagement with the internal screw thread of support plate 14.

During assembly process of the reclining mechanism, the hinge pin 16 is rotatably coupled with the mounting hole 11c of first arm member 11 at its large diameter portion, and the support plate 14 is threadedly engaged with the hinge pin 16. It such a condition, the slide pawls 13 are slidably engaged with the vertical guide groove 11d of first arm member 11 in such manner that the support plate 14 is disposed between the slide pawls 13, and the cam plate 15 is mounted on the hinge pin 16 in such a manner that the cam pins 13d of slide pawls 13 are engaged with the cam slots 15d of cam plate 15. Thereafter, the second arm member 12 is coupled at its lower portion 12a with the upper portion 11a of first arm member 11 for relative rotation about the hinge pin 16 and united with the first arm member 11 by engagement with upper and lower retainer plates 19a and 19b secured to the upper and lower portions 12a and 11a of second and first arm members 12 and 11. The retainer plate 19a is slidably engaged at its lower end portion with a semi-circular upper end of first arm member 11, while the retainer plate 19b is slidably engaged at its upper end portion with a semi-circular lower end of second arm member 12.

As shown in FIG. 3, a support plate 19c is riveted to the upper portion 11a of first arm member 11 and engaged with a stepped portion of hinge pin 16 to retain the hinge pin 16 in position. As shown in FIG. 1, the support plate 19c is formed with a pair of hooks 19d. The spiral torsion spring 17 is engaged at its inner end with the hook portion 16b of hinge pin 16 and at its outer end with one of the hooks 19d to bias the hinge pin 16 in a counterclockwise direction so that the support plate 14 and cam plate 15 are retained in position as shown in FIGS. 4(a) and 4(b).

In a condition where as shown in FIGS. 4(a) and 4(b), the slide pawls 13 are received by the semi-circular stepped portions 14b of support plate 14 and maintained in engagement with the ratchet portion 12e of second arm member 12 to restrict relative rotation of the second arm member 12 with respect to the first arm member 11, the back rest of the vehicle is retained at an inclined angle. When the operation lever 18 is operated to rotate the hinge pin 16 against the load of torsion spring 17 in a clockwise direction, the support plate is moved rightward in the axial direction by rotation of the hinge pin 16 to release the slide pawls 13 therefrom, and the cam plate 15 is rotated with the hinge pin 16 to disengage the slide pawls 13 from the ratchet portion 12e of second arm member 12 as shown in FIGS. 5(a), 5(b) to FIGS. 6(a), 6(b). Thus, relative rotation of the second arm member 12 to the first arm member 11 is permitted for adjustment of the inclined angle of the back rest while the operation lever 18 is retained in its operated position.

When the operation lever 18 is released after adjustment of the inclined angle of the back rest, the hinge pin 16 is rotated under the load of torsion spring 17 in the counterclockwise direction to move the support plate 14 leftward in the axial direction and to rotate the cam plate 15 in the counterclockwise direction. As a result, the slide pawls 13 are brought into engagement with the ratchet portion 12e of second arm member 12 and received by the semi-circular stepped portions 14b of support plate 14 as shown in FIGS. 4(a) and 4(b). In such a condition, the support plate 14 is useful to firmly maintain the slide pawls 13 in engagement with the ratchet portion 12e of second arm member 12 even if the reclining mechanism is applied with a heavy load.

What is claimed is:

1. A reclining mechanism for a vehicle seat comprising:
a first arm member for attachment to a frame structure of a seat cushion or a back rest of the vehicle seat;
a second arm member for attachment to a frame structure of the other of the back rest or the seat cushion, the second arm member being connected with the fist arm member by means of a hinge pin for relative rotation about the binge pin and having a circular ratchet portion concentric with the hinge pin;
a slide pawl slidably coupled with the first arm member in a radial direction with respect to the hinge pin to be moved toward and away from the ratchet portion of the second arm member;
a cam plate mounted on the hinge pin for rotation therewith and being engaged with the slide pawl for engaging the slide pawl with the ratchet portion of the second arm member when the hinge pin is retained in position under load of a torsion spring assembled thereon and for disengaging the slide pawl from the ratchet portion of the second arm member when the hinge pin is rotated against the load of the torsion spring;
a support plate threadedly engaged with the hinge pin to be moved by rotation of the hinge pin in an axial direction for receiving the slide pawl thereon when the slide pawl is maintained in engagement with the ratchet portion of the second arm member and for releasing the slide pawl therefrom when the slide pawl is disengaged from the ratchet portion of the second arm member.

2. A repining mechanism as claimed in claim 1, wherein the slide pawl is formed at an outer end with a semi-circular toothed portion for engagement with the ratchet portion of the second arm member and at an inner end with a semi-circular stepped portion, wherein the cam plate is formed with a cam slot engaged with a cam pin provided on the slide pawl to maintain the slide pawl in engagement with the ratchet portion of the second arm member when the hinge pin is retained in position under the load of the torsion spring and to disengage the slide pawl from the ratchet portion of the second arm member when the hinge pin is rotated against the load of the torsion spring, and wherein the support plate is in the form of an annular plate which is formed with a semi-circular stepped portion for engagement with the semi-circular stepped portion of the slide pawl.

3. A reclining mechanism for a vehicle seat, comprising:
a first arm member for attachment to a frame structure of a seat cushion or a back rest of the vehicle seat;
a second arm member for attachment to a frame structure of the other of the back rest or the seat cushion, the second arm member being connected with the first arm member by means of a hinge pin for relative rotation about the hinge pin and having a circular ratchet portion concentric with the hinge pin;
a pair of diametrically opposed slide pawls slidably coupled with the first arm member in a radial direction with respect to the hinge pin to be moved toward and away from the ratchet portion of the second arm member;

a cam plate mounted on the hinge pin for rotation therewith and being engaged with the slide pawls for engaging the slide pawls with the ratchet portion of the second arm member when the hinge pin is retained in position under load of a torsion spring assembled thereon and for disengaging the slide pawls from the ratchet portion of the second arm member when the hinge pin is rotated against the load of the torsion spring;

a support plate threadedly engaged with the hinge pin to be moved by rotation of the hinge pin in an axial direction for receiving the slide pawls thereon when the slide pawls are maintained in engagement with the ratchet portion of the second arm member and for releasing the slide pawls therefrom when the slide pawls are disengaged from the ratchet portion of the second arm member.

4. A reclining mechanism as claimed in claim 3, wherein the slide pawls each are formed at outer ends with a semi-circular toothed portion for engagement with the ratchet portion of the second arm member and at inner ends with a semi-circular stepped portion, wherein the cam plate is formed with a pair of cam slots engaged with each cam pin provided on the slide pawls to bring the slide pawls into engagement with the ratchet portion of the second arm member when the hinge pin is retained in position under the load of the torsion spring and to disengage the slide pawls from the ratchet portion of the second arm member when the hinge pin is rotated against the load of the torsion spring, and wherein the support plate is in the form of an annular plate which is formed with a pair of semi-circular stepped portions for engagement with the semi-circular stepped portions of the slide pawls.

* * * * *